April 12, 1932.     M. W. CARROLL     1,853,299
SUCKER ROD JOINT
Filed Feb. 28, 1928
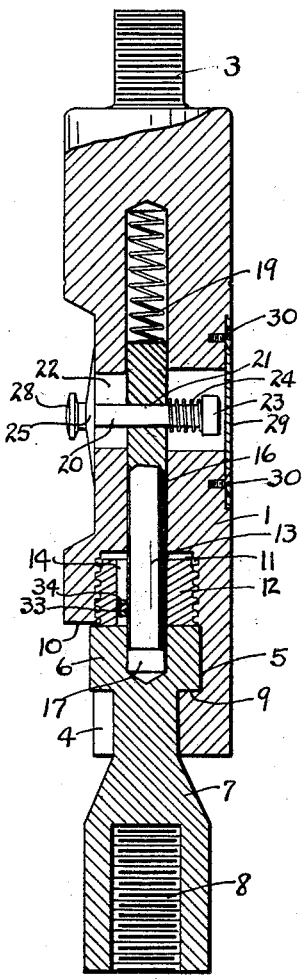
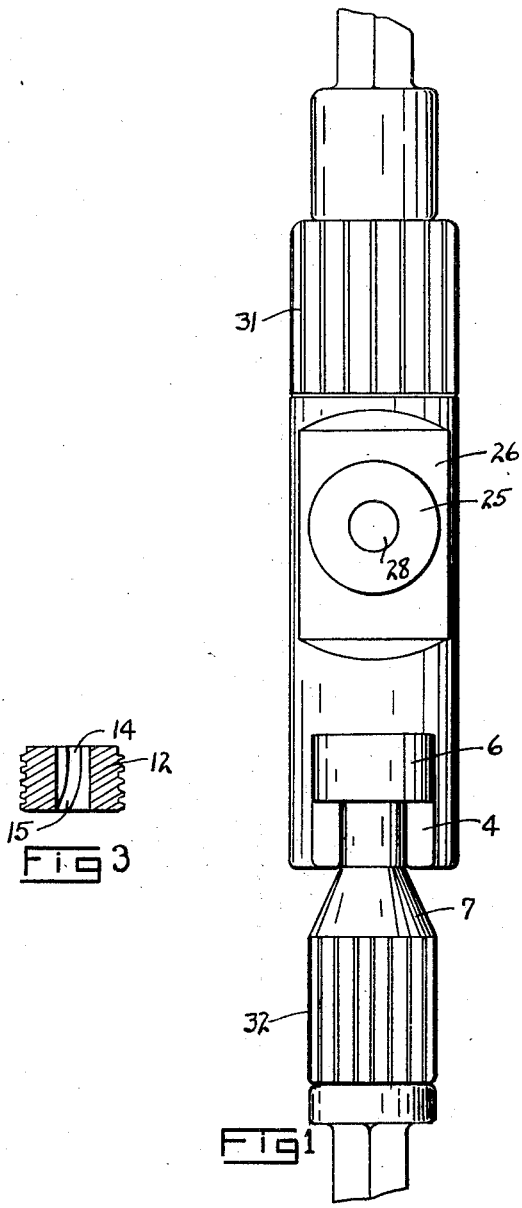
Monroe W. Carroll INVENTOR
By Jesse R. Stone
His ATTORNEY Patented Apr. 12, 1932

1,853,299

UNITED STATES PATENT OFFICE

MONROE W. CARROLL, OF BEAUMONT, TEXAS

SUCKER ROD JOINT

Application filed February 28, 1928. Serial No. 257,590.

My invention relates to joints for sucker rods to be used in pumping, particularly in deep well operations.

The usual sucker rod coupling is one in which the connection between the ends of the sucker rod sections is made by threaded coupling. These threaded couplings are of various construction. The socket may be on the rod and the pin on the coupling, or the reverse, and various modifications have been made.

There is the objection that there may be rotation of the plunger or parts of the rod during the reciprocation of the pump, and the joints may become unscrewed and released.

It is an object of my invention to provide a sucker rod coupling which does not depend upon a threaded connection and in which a swivel action of the sections relative to each other is possible.

It is also an object in a swivel joint of this character to provide means to maintain a tight connection between the parts of the joint at all times and to automatically adjust the connection in case of wear, so that there will be no longitudinal play of one part relative to the other.

It is also an object of my invention to maintain the parts free of sand and sediment so that the operation of the device will be free and positive at all times.

It is a further object to provide a swivel joint of the character stated whereby the connection may be made between the sucker rod sections quickly and expeditiously.

Referring to the drawings herewith, Fig. 1 is a side elevation of a coupling involving my invention.

Fig. 2 is a view largely in central vertical section illustrating the interior construction of my invention, certain parts being in elevation.

Fig. 3 is a vertical section through the adjusting nut employed with the device, said nut being taken at right angles to the view shown in Fig. 2.

The body 1 of the coupling is approximately cylindrical in general outline, and has its upper end provided with a threaded shank 3 for connection with the adjacent sucker rod section. The lower end of the body 1 has a lateral recess 4 therein which is enlarged at 5 to receive a head 6 upon a coupling member 7, the lower end of which is provided with a threaded socket 8 for connection with the sucker rod section. The recess 4 is open at one side to allow the ready insertion of the coupling member 7, the recess 5 having a lower shoulder 9 upon which the head 6 of the coupling will rest. The upper wall 10 of the recess 4 interfits with the head 6 somewhat freely.

Above the recess 4, there is an axial chamber 11 formed in the head 1, this chamber being cylindrical and threaded with a coarse thread to receive a ring nut 12. Said nut fits within said chamber and may be screwed freely therein. On the interior of said ring nut there is a central passage to receive a pin 13. On one side of said passage is a keyway or channel 14, which, as shown in Fig. 3, has its upper end parallel with the axis of the device and the lower end is inclined laterally at 15.

The pin or bolt 13 is adapted to slide within an axial passage 16 in the body 1. It extends downwardly through the nut 12 and engages within a central socket 17 in the upper end of the coupling member 7. At the upper end of the passage 16 in which the bolt 13 is slidable is a compression spring 19 which bears against the upper end of the bolt and tends to hold it resiliently downward.

Said bolt may be moved upwardly against the action of the spring by means of a cross pin 20, which extends transversely through an opening 21 in said bolt and is slidable within a slot 22 in the body 1 of the coupling. The pin 20 has on its inner end a nut 23, which may be screwed upon the end of the pin. A coil spring 24 is provided between the nut 23 and the bolt 13, thus tending to hold the pin 20 within the slot 22. The outer end of the pin 20 has thereon a disc-shaped head or plate 25, which is slidable on a flattened surface 26 on the side of the coupling adjacent said head, the outer surface of the coupling head 1 being recessed to provide a flattened surface 26, as will be clear from the drawings. A head 28 upon the pin 20 enables the operation of the device, as will be later described. The bolt 13 is prevented from rotation by the cross pin 20, which is limited in its rotation by the slot 22.

The end of the slot 22 in which the pin 20 is movable is closed on the side opposite the disc 25 by any desired means such as a plug or a plate 29 which is fitted over the end of the slot and secured in counter-sunk position upon said coupling head by screws 30. As will be seen from Fig. 1, the upper end 31 of the coupling is grooved longitudinally to better engage with a wrench or tongs. The lower end of the coupling member 7 is likewise grooved or channeled at 32.

In the operation of this device, the coupling member 7 will be screwed upon the upper end of the adjacent sucker rod section and the upper head 1 of the adjacent coupling member will be screwed within the lower end of the next upper sucker rod section. When thus screwed together, these parts may be left permanently upon the sucker rod sections and when it is necessary to engage the sucker rod sections together, the operator will move the pin 20 in a direction to retract the bolt 13 to a position free of the socket 5 and then the head 6 of the coupling member may be introduced freely therein and the bolt allowed to snap back into the recess 17 to lock the head of the coupling member 7 in position. In arranging the nut 12 in the coupling member 1, the said nut will be screwed within its seat so that when the head 6 is introduced into the socket, the nut 12 will be closely adjacent the upper end of the head 6. When the operator releases the bolt 13 so as to allow it to snap into position in the recess 17 of the coupling member, a pin 33 formed on the side of the bolt 13 will ride in the keyway 14 of the nut 12. A rotatable non-friction ring 34 is provided with the pin 33 so that it will be enabled to roll freely in the groove 14. As the bolt approaches the lower end of the keyway 14 and moves into the inclined portion 15 of said slot, it will tend to rotate the nut 12 and the nut is thereby screwed downwardly so as to engage with the upper end of the head 6. The spring 19 will hold the bolt 13 resiliently downward so as to tend to screw the nut farther downwardly in case of gear between the nut and the head 6. There will, therefore, be an automatic take-up provided between the two couplings 7 and 1 so that there will at no time be any play or lost motion between the parts.

The device will be practically fluid-tight so that no sand or sediment will tend to work in about the operative parts of the joint. The disc plate 25 upon the pin 20 will close one end of the slot 22 through the body and the plate 29 upon the opposite side thereof will prevent the entrance of fluid from that side. I contemplate that there will be a ground joint between the plate 25 and the surface 26 of the coupling body, so that the device will be maintained fluid-tight at all times through the action of the spring 24, previously described. If desired a ring of packing may be placed about the bolt 13 and on top of the nut 12 to prevent the entrance of grit.

The advantages of my device lie in the facts that the coupling between the adjacent sections may be made quickly and without the necessity of tools, and that a swivel action is allowed which will prevent a tendency to unscrew the connections along the rod, and furthermore, that an automatic take-up for wear is provided between the two ends of the adjacent sections which, because of its peculiar construction will be adapted to receive shocks or strains in operation and still be free to adjust itself at all times. The further advantages of the device will be obvious to those skilled in the art.

What I claim as new is:

1. A joint for rods and the like comprising a coupling member having a laterally opening socket in one end thereof, a co-engaging coupling member having a head shaped to fit within said rocket, a bolt in one coupling member slidable with a recess in the other member to hold said head in said socket, and adjustable means operative by said bolt and engaging between said members to prevent end play.

2. A joint for rods and the like comprising upper and lower coupling members, one of said members having a socket and the opposite member a head engaging within said socket, latching means in one member slidable into engagement with the other to prevent disengagement of said members, and means actuated by said latching means to hold said members against relative longitudinal movement.

3. A joint for rods and the like comprising upper and lower coupling members, one of said members having a socket and the opposite member a head engaging within said socket, latching means in one member slidable into engagement with the other to prevent disengagement of said members, resilient means holding said latching means in latching position, a pin to retract said latching means, and means actuated by said pin to hold said members from relative longitudinal movement.

4. A rod joint swivel including upper and lower coupling members adapted to slidably interfit, latching means on one member adapted to engage the other said member to hold said members releasably together, and means including a ring movable after assembly to hold said members from relative longitudinal movement.

5. A rod joint including upper and lower coupling members adapted to slidably interfit, latching means on one member adapted to engage the other said member to hold said members together, and means threaded within one of said members and rotatable by said latching means to screw the same into contact with the other said member to prevent relative play between said members.

6. A rod joint including upper and lower coupling members adapted to slidably interfit, latching means on one member adapted to engage the other said member to hold said members releasably together, and means comprising a nut screwed within one of said members and a lug on said latching means to screw said nut so that it will be automatically controlled by said latching means to bear against the other of said members.

7. A rod joint comprising two co-engaging coupling members, a bolt on one said member engaging within the other to prevent detachment, and means adjustable by said bolt to prevent the entrance of sand and sediment about said bolt.

8. In a rod joint coupling a pair of co-engaging members, a bolt slidable from one into the other of said members, and means longitudinally movable by said bolt to prevent subsequent longitudinal movement of said members.

9. In a rod joint a pair of co-engaging members a bolt slidable from one into the other of said members to retain them in engaging position, adjustable means to take up end play between said members, said means being adjusted by longitudinal movement of said bolt, and means to prevent rotation of said bolt.

10. A joint for rods and the like comprising a coupling member having a laterally opening socket in one end thereof, a co-engaging coupling member having a head shaped to fit within said socket, a bolt in one coupling member slidable within a recess in the other member to hold said head in said socket, means in one end of said socket bearing against said head to prevent longitudinal play, and a connection between said bolt and said means whereby said means is adjustable automatically to take up for wear.

In testimony whereof I hereunto affix my signature this 22 day of February, A. D. 1928.

MONROE W. CARROLL.